US008369848B1

(12) United States Patent
Lopes et al.

(10) Patent No.: US 8,369,848 B1
(45) Date of Patent: *Feb. 5, 2013

(54) SYSTEM AND METHOD FOR PROVIDING CONTENT TO PORTABLE DEVICES

(75) Inventors: Veronica M. Lopes, Bedford, TX (US); Doug Backelin, Bedford, TX (US); Erik Miller, Owasso, OK (US); Henry Joyner, Colleyville, TX (US); David Gaspar, Dallas, TX (US); Thomas J. Dolan, Coppell, TX (US)

(73) Assignee: American Airlines, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,446

(22) Filed: Mar. 29, 2012

Related U.S. Application Data

(63) Continuation of application No. 12/617,159, filed on Nov. 12, 2009, now Pat. No. 8,170,535, which is a continuation of application No. 11/041,837, filed on Jan. 24, 2005, now abandoned.

(51) Int. Cl.
H04W 4/00 (2009.01)
(52) U.S. Cl. .................. 455/431; 455/414.1; 455/414.2; 455/414.3
(58) Field of Classification Search ............... 455/414.1, 455/414.2, 414.3, 431
See application file for complete search history.

(56) References Cited

U.S. PATENT DOCUMENTS

| 6,047,165 | A | 4/2000 | Wright et al. |
| 6,181,990 | B1 | 1/2001 | Grabowsky et al. |
| 6,990,338 | B2 | 1/2006 | Miller et al. |
| 8,170,535 | B1 | 5/2012 | Lopes et al. |
| 2002/0069132 | A1 | 6/2002 | Perkes et al. |
| 2002/0178451 | A1* | 11/2002 | Ficco .............................. 725/76 |
| 2003/0003899 | A1 | 1/2003 | Tashino et al. |
| 2003/0130769 | A1 | 7/2003 | Farley et al. |
| 2004/0042432 | A1 | 3/2004 | Riazi et al. |
| 2004/0249768 | A1 | 12/2004 | Kontio et al. |
| 2005/0165849 | A1* | 7/2005 | Moradi et al. ............. 707/104.1 |
| 2005/0278228 | A1 | 12/2005 | Schultz |
| 2006/0107295 | A1* | 5/2006 | Margis et al. ................... 725/81 |
| 2006/0116965 | A1 | 6/2006 | Kudo et al. |

OTHER PUBLICATIONS

IMS; Terminal Cellular Bridge (2 pages).
IMS; Terminal Data Loader (2 pages).
Teledyne Controls; Wireless GroundLink; www.Teledyne-controls.com/productsolution/groundlink_FAQ.asp.
Office Action mailed Jan. 26, 2007, by the USPTO, regarding U.S. Appl. No. 11/041,837.
Office Action mailed Jul. 13, 2007, by the USPTO, regarding U.S. Appl. No. 11/041,837.
Office Action mailed Mar. 26, 2008, by the USPTO, regarding U.S. Appl. No. 11/041,837.
Office Action mailed Jul. 21, 2008, by the USPTO, regarding U.S. Appl. No. 11/041,837.
Office Action mailed May 12, 2009, by the USPTO, regarding U.S. Appl. No. 11/041,837.
Office Action mailed Apr. 14, 2011, by the USPTO, regarding U.S. Appl. No. 12/617,159.
Office Action mailed Nov. 2, 2011, by the USPTO, regarding U.S. Appl. No. 12/617,159.
Notice of Allowance mailed Dec. 28, 2011, by the USPTO, regarding U.S. Appl. No. 12/617,159.

* cited by examiner

*Primary Examiner* — Charles N. Appiah
*Assistant Examiner* — Jaime Holliday
(74) *Attorney, Agent, or Firm* — Haynes and Boone, LLP

(57) ABSTRACT

The present disclosure introduces a system and method for distributing content. Content is stored on a server located on a vehicle prior to departure by the vehicle for a destination. A portable device is provided by a passenger on the vehicle. A communication link is established between the server and the portable device, and the content is transmitted to the portable device.

25 Claims, 4 Drawing Sheets

SYSTEM AND METHOD FOR PROVIDING CONTENT TO PORTABLE DEVICES

CROSS-REFERENCE TO RELATED APPLICATION

This application is a continuation of U.S. application Ser. No. 12/617,159, filed Nov. 12, 2009, which is a continuation of U.S. application Ser. No. 11/041,837, filed Jan. 24, 2005, the entire disclosures of which are incorporated herein by reference.

BACKGROUND

This invention relates to a system and method for providing content, and more particularly, to a system and method for providing content to portable devices.

In today's global economy, travel is common and necessary for business and leisure purposes. One aspect of travel has been the delivery of content to passengers for communicating safety instructions, displaying travel information, and providing entertainment during travel. Travel service providers strive to provide content to passengers while considering the needs and desires of the passengers.

DETAILED DESCRIPTION

Figure 1:
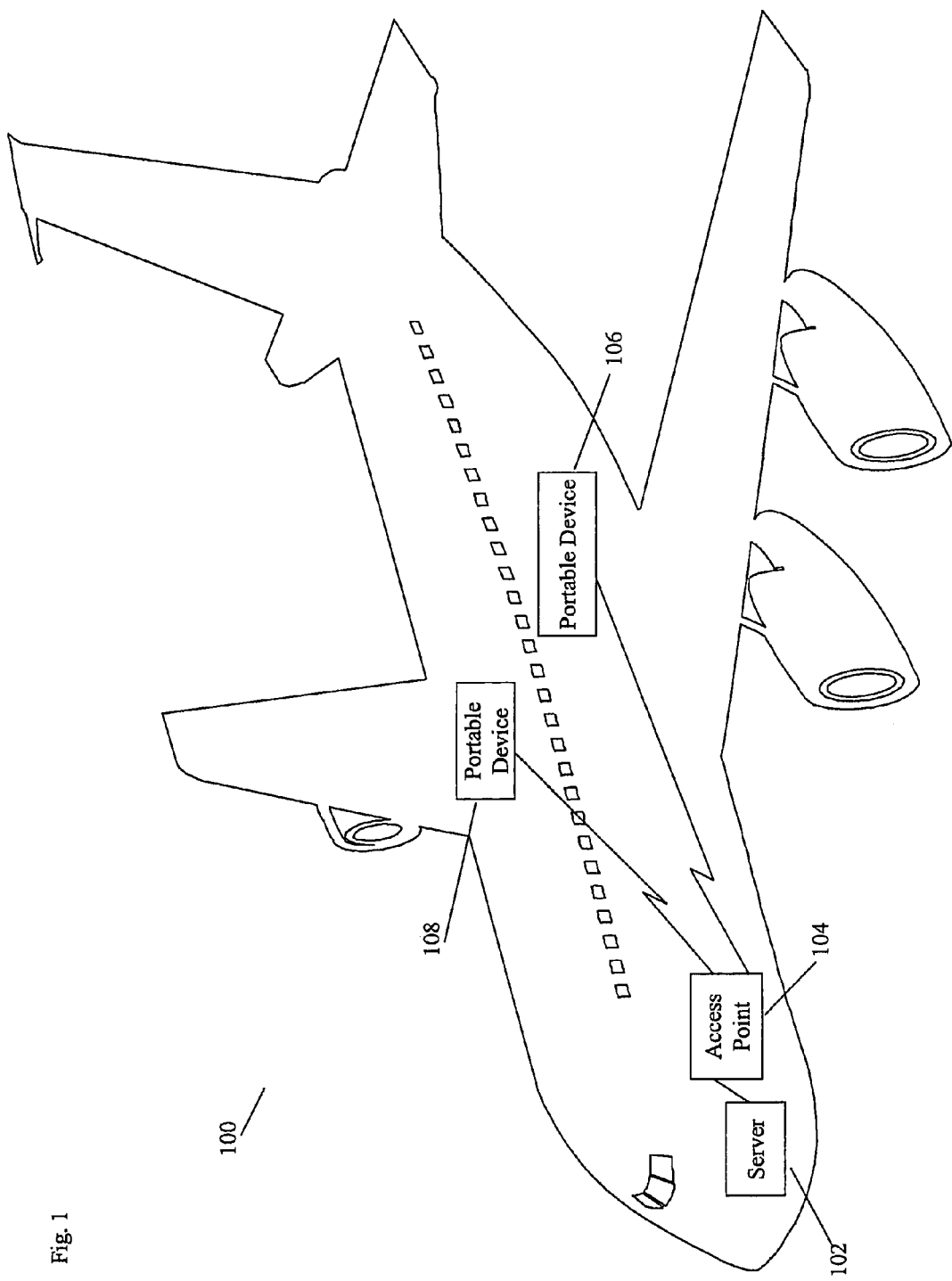
FIG. 1 is an illustration of at least a portion of an exemplary embodiment of a general system for providing content to portable devices according to aspects of the present disclosure.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, while many of the examples provided below pertain to transactions often conducted in the course of airline industry business, aspects of the present disclosure are applicable and/or readily adaptable to other industries, including rail, bus, cruise and other travel or shipping industries, rental car industries, hotels and other hospitality industries, entertainment industries, and others.

One embodiment for providing content to portable devices is illustrated in FIG. 1. In this embodiment, a vehicle 100 is shown. In one embodiment, the vehicle 100 may be a passenger airplane. A server 102 may be installed on a vehicle 100. In communication with server 102 is an access point 104. Access point 104 can be a router, switch, wireless access point, or any other device or module, or a combination thereof, that enables communication between electronic devices.

Portable devices 106 and 108 may be utilized to access and consume data stored on the server 102. In one embodiment, passengers of the vehicle 100 may provide the portable devices 106 and 108. In another embodiment, operators of the vehicle 100 may utilize portables devices 106 and 108 to perform work-related functions.

Figure 2:
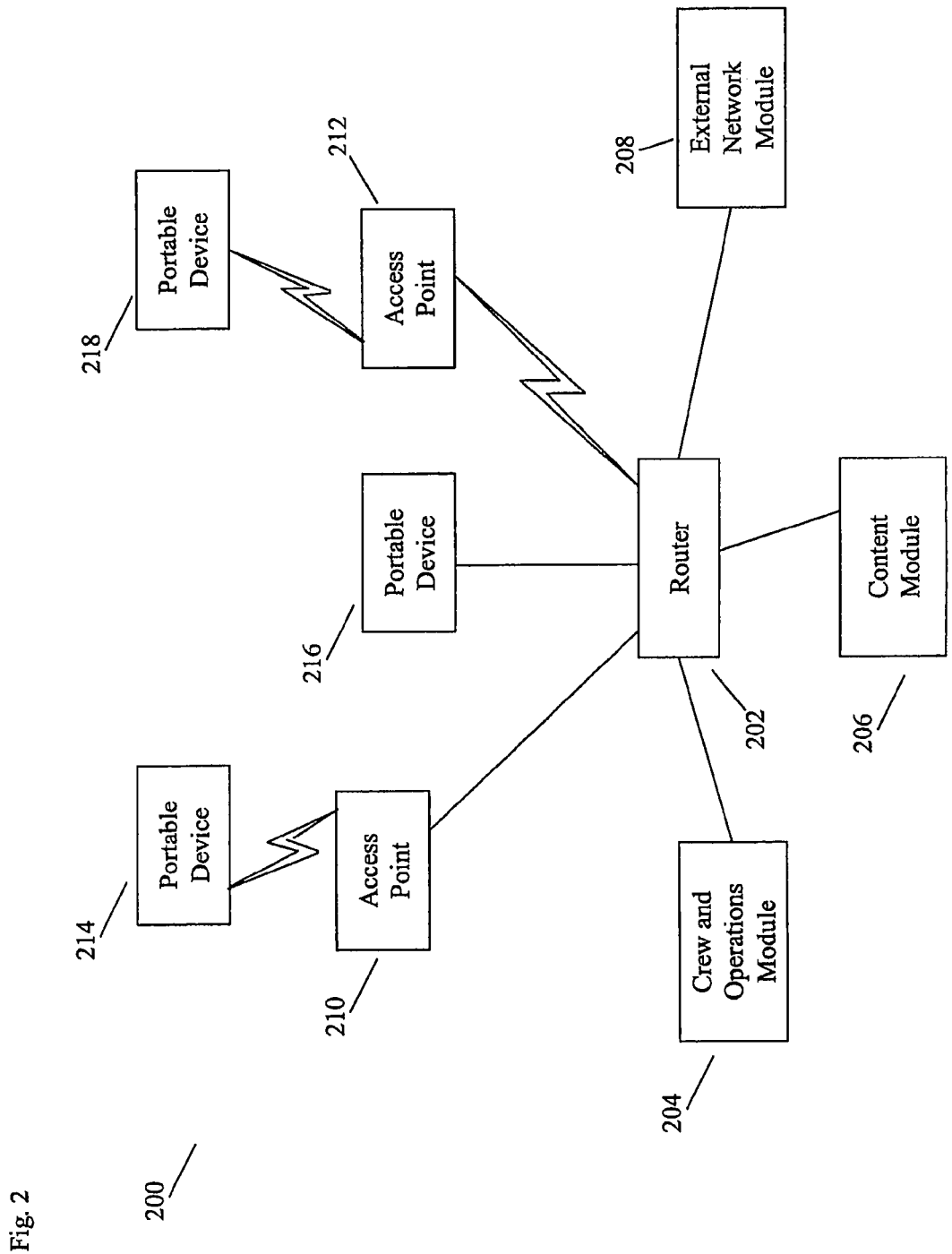
FIG. 2 is an illustration of at least a portion of an exemplary embodiment of a system for providing content to portable devices according to aspects of the present disclosure.

Referring to FIG. 2, at least a portion of an exemplary embodiment of a system 200 for providing content to portable devices is illustrated. In this embodiment, the system 200 may be utilized on a vehicle, and may include a router 202, a crew and operations module 204, a content module 206, and an external network module 208.

In this embodiment, three portable devices 214, 216, and 218 are shown. The portable devices 214, 216, and 218 may communicate with router 202 by a variety of means, such as through a wireless or wired link as described below. In this embodiment, portable device 214 communicates wirelessly with access point 210, which communicates via a wired connection with router 202. Portable device 216 communicates via a wired communication with router 202. Portable device 218 communicates wirelessly with access point 212, which communicates via a wireless connection with router 202. The wireless communication can be implemented via a wireless access card, antenna, or other devices that are capable of communicating with one or more access points 210 and 212.

Crew and operations module 204 may be a server that provides work-related functions for operators of the vehicle. In one embodiment, crew and operations module 204 monitors flight data and provides functionality for flight attendants and flight crews. Content module 206 may be a server capable of storing content and other data and information. External network module 208 provides functionality for communication with a network external to the vehicle.

While router 202, access point 210, access point 212, crew and operations module 204, content module 206, and external network module 208 are depicted separately, it is contemplated that any of the foregoing could be combined in any manner, whether in hardware, software, or a combination of both. Further, each module or device could implemented across be a plurality of servers or other computing devices.

The content stored in content module 206 may include safety videos, music, games, movies, television programs, books, magazines, catalogs, audio programming, such as songs, audio books, and other audio materials, arrival videos, maps, operational applications, recreational applications, and/or any other types of information or content. In addition, the content may include current information, which is information that changes based on current events, such as weather, news, and sports scores.

The content stored in content module 206 may be stored by a variety of means. In one embodiment, at a designated location, such as an airport, airport terminal, hangar, maintenance facility or gate, content module 206 may be connected to a network external to the vehicle, so that content from the external network may be transferred to and stored in content module 206. Content module 206 may use external network module 208 to communicate with the network external to the vehicle. In one embodiment, network module 208 is capable of communicating with an external network while the vehicle is in transit to its destination using techniques known in the art, including satellite links, UHF data links, and cellular based systems.

In another embodiment, the content may be stored on a removable hard disk drive (not shown) of content module

206. The removable hard disk drive may be replaced by a new hard disk drive, which has been preloaded with alternate content. In another embodiment, instead of replacing the hard disk drive, a media loading device with preloaded content, such as a CD or DVD or other device, may be utilized for new data into content module 206. It is also contemplated that the content may be loaded into content module by other methods known in the art. In one embodiment, content stored in content module 206 may be changed at suitable frequencies, such as once a month, once a week, or other desired times. In one embodiment, the content is loaded onto the content module 206 prior to departure by the vehicle for its destination location.

Content module 206 may also contain a filtering module, whether hardware or software, for content filtering and virus scanning. The filtering device may also include a parental management function. In one example, categories of information within the content in content module 206 may be assigned an appropriate parental management level. In one embodiment, parental management levels are equivalent to the standards used by the Motion Picture Association of America.

In addition, content module 206 can be configured by a user of a portable device so that only content that meets the appropriate parental management level is available and/or transmitted to the portable device. In this embodiment, a user of a portable device could define, for example, that only G- or PG-rated content be transmitted from the content module 206. Other parental management levels can be established, as well.

Each of the portable devices 214, 216, and 218 may be one or more computing devices such as personal computers, personal digital assistants, pagers, cellular devices, mobile telephones, wireless devices, handheld devices, laptops, audio devices, game consoles, cameras, and/or any other suitable devices. In one embodiment, the portable devices 214, 216, and 218 may be supplied by passengers of the vehicle for accessing the content stored in content module 206. In another embodiment, the portable devices 214, 216, and 218 may be supplied by the operator of the vehicle. In an additional embodiment, portable devices 214, 216, and 218 may be removably connectable to the vehicle, such as by temporarily attaching the portable device to a seat or a table in the vehicle. In a further embodiment, the portable devices 214, 216, and 218 may be permanently installed in the vehicle.

Each of the access points 210 and 212 may be provided by the airline, airline passengers, and/or other entities. In one embodiment, each of the access points 210 and 212 has an associated location cell (not shown), which represents a physical area where the respective access point possesses sufficient signal strength to transmit and receive data to and from the portable devices 214 and 218. Each of the access points 210 and 212 may be fixed access points or intermediate access points that are not directly connected to router 202. It is contemplated that system 200 may include a fewer or a greater number of access points, and that a fewer or a greater number of access points may be in communication with router 202. Even though in this illustration, the access points 210 and 212 are disparate from router 202, it is contemplated that alternatively, at least one of the access points 210 and 212 may reside on, or be integrated or combined with, router 202, and/or may be an antenna for any or all of crew and operations modules 204, content module 206, and external network module 208.

Each of the portable devices 214, 216, and 218 may be identified by router 202 by an address or a combination of addresses, such as a media control access (MAC) address associated with the network interface and an Internet protocol (IP) address. In addition, the portable devices 214, 216, and 218 may be connectable to a network external to the vehicle. This external network may be an intranet, a subnet of a local area network, or the Internet.

It is understood that the portable devices 214, 216, and 218 may be concentrated at a single location or may be distributed, and that some portable devices may be incorporated into other portable devices. In addition, each of the portable devices 214, 216, and 218 may be associated with system identification information that allows access to information within the system to be controlled based upon authority levels associated with each portable device's identification information.

Router 202 may direct traffic based on routing considerations such as destination address, packet priority level, least-cost route, minimum route delay, minimum route distance, route congestion level, and community of interest. Router 202 may utilize a traditional topology—each of its ports may define a physical subnet, and each subnet is a broadcast domain. Within that domain, all connected devices share the broadcasted traffic. However, devices outside of that domain cannot identify or respond to that traffic. Also, the router may have the ability to define subnets on a logical basis, based on logical address (e.g. MAC or IP address) information contained within the packet header. In addition to a standalone router, the router may also be server-based. In that case, it may be in the form of a high-performance PC with routing software. In addition, a switch may be used to assist in routing traffic.

The system 200 may also include an optional proxy server (not shown). The proxy server may be a software program that resides on a PC and conducts address translation—allocating IP addresses as the need arises. The proxy server may distribute processing load, provide an added layer of security, and cache content from content module 206. Further, the proxy server may establish an on-demand connection between the crew and operations module 204, content module 206, or external network module 208 and a portable device, so that if no data traffic exists over the connection for a period of time, the proxy server may turn off the connection, and re-establish the connection when demand arises.

It is contemplated that the system 200 may utilize various wired, wireless, and radio frequencies technologies, examples of which include Bluetooth, 802.11b, 802.11g, 802.11a, ultra wideband (UWB), multiple band rates, and other suitable technologies. It is also contemplated that the system 200 may support known or future wireless local area network (WLAN) and wireless wide area network (WWAN) technologies.

Figure 3:
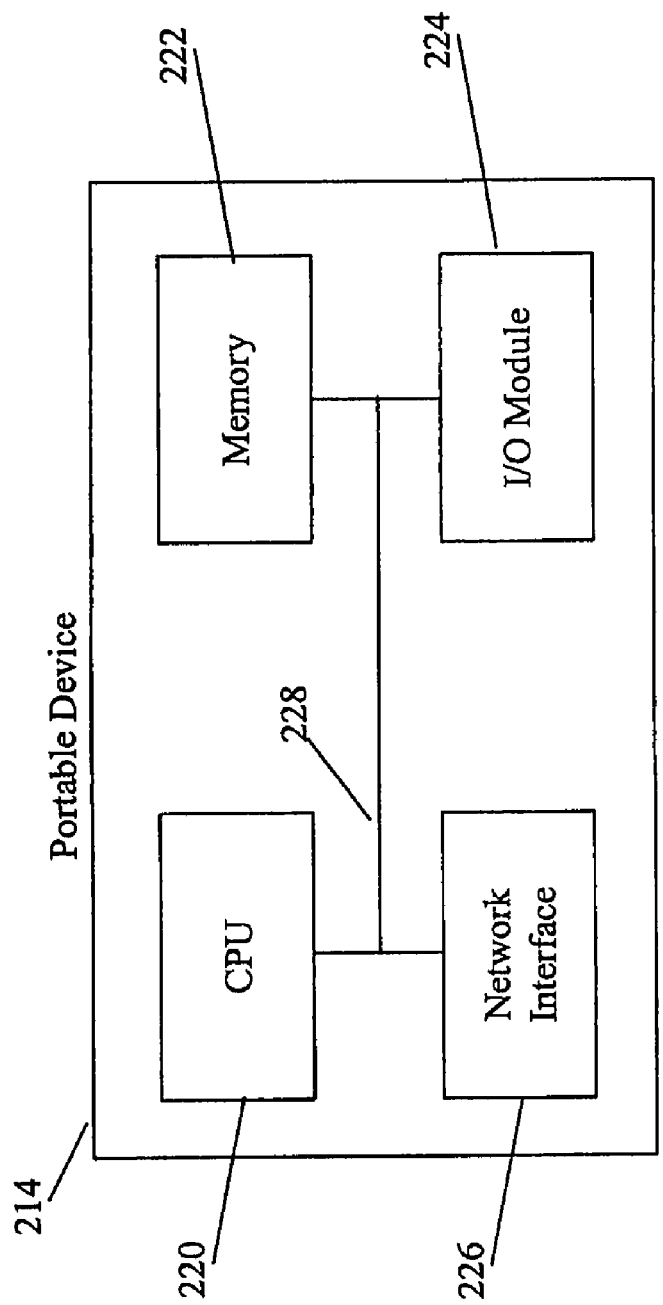
FIG. 3 is an illustration of an exemplary embodiment of a component from the system of FIG. 2 according to aspects of the present disclosure.

Referring now to FIG. 3, an example of one form of portable device 214 is shown. Portable device 214 contains a central processing unit (CPU) 220, a memory unit 222, an input/output (I/O) module 224, and a network interface 226. Network interface 226 may be, for example, a modem, a wireless transceiver, and/or one or more network interface cards. The components 220-226 are interconnected by a bus system 228. It is understood that the portable device 214 may be differently configured and that each of the listed components may represent several different components. For example, CPU 220 may represent a multi-processor or a distributed processing system; the memory unit 222 may include different levels of cache memory, main memory, hard disks, and remote storage locations; and the I/O module 226 may include one or more monitors, keyboards, video goggles, head phone jacks, head phones, or other devices to facilitate interaction with and consumption of content.

Figure 4:
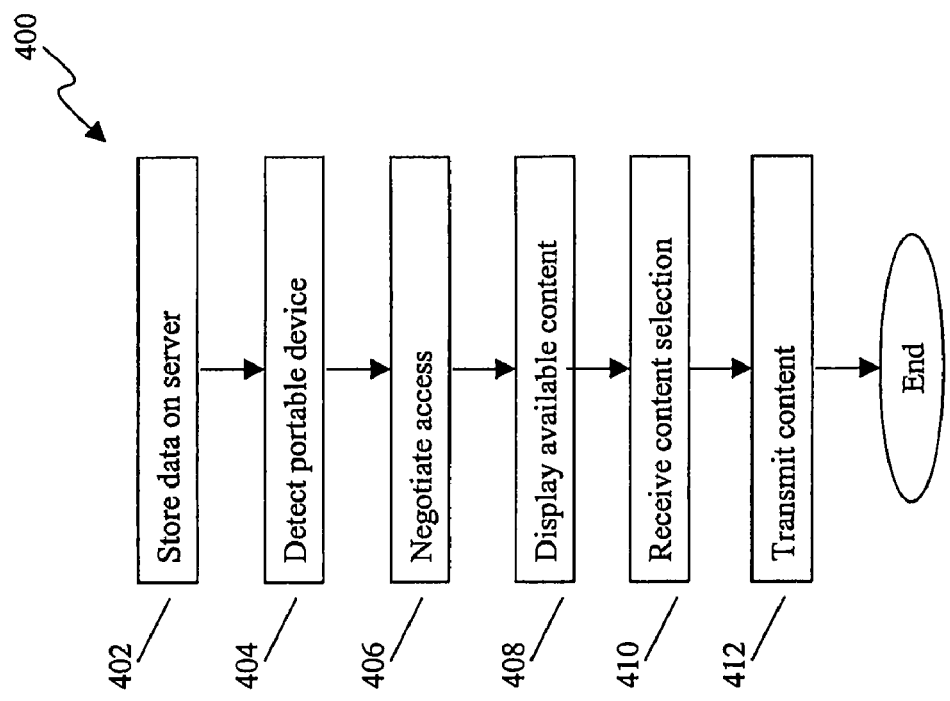
FIG. 4 is a flow chart illustration of at least a portion of an exemplary embodiment of a process for providing content to portable devices according to aspects of the present disclosure.

Referring now to FIG. 4, an example operational flowchart 400 of an embodiment of the present disclosure is shown. At step 402, content is stored on a server in a vehicle. The content may include safety videos, music, games, movies, television programs, books, magazines, audio programming, such as songs, audio books, and other audio materials, arrival videos, maps, operational applications, recreational applications, and/or any other types of information or content. In addition, the content may include current information that changes based on current events, such as weather, news, and sports scores.

At step 404, the server detects a portable device. It is contemplated that the server may utilize various wired, wireless, and radio frequencies technologies, examples of which include Bluetooth, 802.11b, 802.11g, 802.11a, ultra wideband (UWB), multiple band rates, and other suitable technologies. It is also contemplated that the system 200 may support known or future wireless local area network (WLAN) and wireless wide area network (WWAN) technologies. In one embodiment, the detection may be performed by the server, a router or an access point. In another embodiment, the portable device detects the server, router or access point.

At step 406, once a portable device is detected, the server and portable device will negotiate the access level for the portable device. In one embodiment, the server may cause software to be stored on the portable device in order for the portable device to access the server. In another embodiment, the user of the portable device may set access levels with respect to the content during the negotiation process, such as by using content filtering software. The user may also establish parental management levels for the content.

At step 408, the server causes the content that is stored on the server to be selectable by the user of the portable device. In one embodiment, the content is sorted by content type and may be selectable by an on-screen menu. In another embodiment, the stored content is displayed as a list to the user.

At step 410, the server receives a selection from a user of the portable device for a particular piece of content. In one embodiment, the user may purchase the right to consume a piece of content, such as a movie. In this embodiment, the selection may also include payment processing information. Consumption of content can be viewing, listening, or using or a combination of the foregoing. In another embodiment, the user may purchase goods or other services, such as via catalogs.

Additionally, certain content may be made available for consumption without payment, while other content is made available for consumption but only upon receipt of payment. Payment may be processed prior to delivery of the content, such as communicating with an external network. In another embodiment, payment can be process after arrival at the destination location.

At step 412, the server causes the selected content to be transmitted to the portable device. In one embodiment, the content is transmitted from server to the portable device and stored on portable device. In a further embodiment, the user of the portable device is not allowed to consume the content until the entirety of the content is stored on portable device. In an alternative embodiment, the content is streamed to the portable device so that the user of the portable device is able to consume the content as it is transmitted to the portable device, but without storing the content on the portable device. In a further embodiment, the content can be streamed to the portable device for consumption, and also stored on the portable device as it is streamed.

In a further embodiment, additional content is transmitted to the portable device as part of the content selected by the user. One example of additional content may be advertising materials for display to the user before, during or after viewing of the selected content.

In another embodiment, the content may be securely transferred to the portable device using methods known in the art, such an encryption. In a further embodiment, a digital rights management (DRM) platform may be used to manage the access, use and viewing of the content on the portable device. The DRM platform may operate from the server, or could be software transmitted to the portable device. In one example, the DRM platform permits the content only to be viewed a limited number of times before rendering the content inaccessible or causing the content to be deleted from the portable device. In another example, the content can be deleted from the portable device after a set period of time, which could be limited to the duration of the travel on the vehicle or any other desirable period of time.

Variations may be made in the foregoing without departing from the scope of the present disclosure. For example, while the examples used herein may be related to air travel, it is understood that the system and method embodiments described herein are applicable or readily adaptable for use in any form of travel, hospitality, and/or other industry, including but not limited to rail, cruise ship, shipping, hotel, office, rental car, and busing industries.

In general, the present disclosure introduces a system and method for distributing information. In one embodiment, a method for distributing content comprises storing content on a server located on a vehicle prior to departure by the vehicle for a destination, establishing a communication link between the server and the at least one portable device, wherein the at least one portable device is provided by a passenger on the vehicle, and transmitting the content to the at least one portable device.

In another embodiment, a system for wirelessly distributing information comprises a server located within a vehicle, content stored on the server, wherein the content is stored on the server prior to departure by the vehicle, and at least one access point, in communication with the server, that is capable of communicating with at least one portable device.

In a further embodiment, a method for in-flight entertainment comprises storing content on a server located on a vehicle prior to departure by the vehicle for a destination, detecting at least one portable device, wherein the at least one portable device is provided by a passenger on the vehicle, establishing a communication link between the server and the at least one portable device, receiving a selection from the passenger of content, transmitting the selected content to the at least one portable device using a digital rights management platform, and causing the selected content to be removed from the at least portable device.

In yet another embodiment, a system for distributing information comprises a means for storing preloaded content on an airplane, a means for wirelessly communicating with a plurality of portable devices brought onto the airplane by a plurality of passengers of the airplane, and a means for transmitting the preloaded content to at least one of the plurality of portable devices.

In another embodiment, a computer-readable medium comprises a series of instructions for execution by at least one processor, wherein the instructions are for detecting at least one portable device, wherein the at least one portable device is provided by a passenger on a vehicle, establishing a communication link between a server and the at least one portable device, wherein the server is located on the vehicle, receiving a selection of content from the passenger, wherein the content was stored on the server prior to departure by the vehicle for a destination, and transmitting the selected content to the at least one portable device using a digital rights management platform.

The foregoing has outlined features of several embodiments according to aspects of the present disclosure. Those skilled in the art should appreciate that they may readily use the present disclosure as a basis for designing or modifying other processes and systems for carrying out the same purposes and/or achieving the same advantages of the embodiments introduced herein. Those skilled in the art should also realize that such equivalent constructions do not depart from the spirit or scope of the present disclosure, and that they may make various changes, substitutions and alterations herein without departing from the spirit or scope of the present disclosure.

What is claimed is:

1. A method comprising:
storing a plurality of content on a server located on a vehicle prior to departure by the vehicle for a destination location;
sending a communication signal from the server to at least one portable device located within the vehicle;
transmitting software from the server to the at least one portable device so that the software is stored on the at least one portable device, the software comprising a digital rights management platform, wherein the digital rights management platform manages access to at least one of the plurality of content;
receiving an input selecting a first content of the plurality of content;
permitting access to the first content on the server using the digital rights management platform stored on the at least one portable device; and
transmitting the first content to the at least one portable device during travel to the destination location.

2. The method of claim 1, wherein the vehicle is an airplane; and
wherein the at least one portable device is provided by a passenger on the airplane.

3. The method of claim 1, further comprising receiving payment information after transmitting the first content to the at least one portable device.

4. The method of claim 1, further comprising enabling the first content to be consumed after the airplane has arrived at the destination location.

5. The method of claim 1, wherein the transmitting the first content transmits the first content by streaming the first content to the at least one portable device.

6. A system comprising:
one or more processors;
a computer readable medium operably coupled to the one or more processors; and
a plurality of instructions stored on the computer readable medium and executable by the one or more processors, the plurality of instructions comprising:
instructions that cause the one or more processors to store a plurality of content on a server located on a vehicle prior to departure by the vehicle for a destination location;
instructions that cause the one or more processors to send a communication signal from the server to at least one portable device located within the vehicle;
instructions that cause the one or more processors to transmit software from the server to the at least one portable device so that the software is stored on the at least one portable device, the software comprising a digital rights management platform, wherein the digital rights management platform manages access to at least one of the plurality of content;
instructions that cause the one or more processors to receive an input selecting a first content of the plurality of content;
instructions that cause the one or more processors to permit access to the first content on the server using the digital rights management platform stored on the at least one portable device; and
instructions that cause the one or more processors to transmit the first content to the at least one portable device during travel to the destination location.

7. The system of claim 6, wherein the vehicle is an airplane; wherein the at least one portable device is provided by a passenger on the vehicle; and wherein the server comprises at least one of the one or more processors.

8. The system of claim 6, wherein the plurality of instructions further comprises instructions that cause the one or more processors to receive payment information after the first content is transmitted to the at least one portable device.

9. The system of claim 6, wherein the plurality of instructions further comprises instructions that cause the one or more processors to enable the first content to be consumed after the vehicle has arrived at the destination location.

10. The system of claim 6, wherein the plurality of instructions further comprises instructions that cause the one or more processors to transmit the first content by streaming the first content to the at least one portable device.

11. A method comprising:
storing a plurality of content on one or more servers prior to departure by a vehicle for a destination location;
sending a communication signal from at least one of the one or more servers to at least one portable device located within the vehicle;
transmitting a digital rights management platform from the at least one of the one or more servers to the at least one portable device so that the digital rights management platform is stored on the at least one portable device, wherein the digital rights management platform manages access to at least one of the plurality of content;
receiving an input selecting a first content of the plurality of content;
permitting access to the first content on the one or more servers using the digital rights management platform stored on the at least one portable device;
transmitting the first content from the at least one of the one or more servers to the at least one portable device during travel to the destination location.

12. The method of claim 11, further comprising receiving payment information after transmitting the first content to the at least one portable device.

13. The method of claim 11, further comprising enabling the first content to be consumed after the vehicle has arrived at the destination location.

14. A system comprising:
one or more processors;
a computer readable medium operably coupled to the one or more processors; and
a plurality of instructions stored on the computer readable medium and executable by the one or more processors, the plurality of instructions comprising:
instructions that cause the one or more processors to store a plurality of content on one or more servers prior to departure by a vehicle for a destination location;
instructions that cause the one or more processors to send a communication signal from at least one of the one or more servers to at least one portable device located within the vehicle;
  instructions that cause the one or more processors to transmit a digital rights management platform from the at least one of the one or more servers to the at least one portable device so that the digital rights platform is stored on the at least one portable device, wherein the digital rights management platform manages access to at least one of the plurality of content;
  instructions that cause the one or more processors to receive an input selecting a first content of the plurality of content;
  instructions that cause the one or more processors to permit access to the first content on the one or more servers using the digital rights management platform stored on the at least one portable device; and
  instructions that cause the one or more processors to transmit the first content from the at least one of the one or more servers to the at least one portable device during travel to the destination location.

15. The system of claim 14, wherein the plurality of instructions further comprises instructions that cause the one or more processors to receive payment information after the first content is transmitted to the at least one portable device.

16. The system of claim 14, wherein the plurality of instructions further comprises instructions that cause the one or more processors to enable the first content to be consumed after the vehicle has arrived at the destination location.

17. A method comprising:
  locating an access point within a vehicle prior to departure by the vehicle for a destination location;
  sending a communication signal from the access point to at least one portable device located within the vehicle;
  transmitting a digital rights management platform to the at least one portable device so that the digital rights management platform is stored on the at least one portable device, wherein the digital rights management platform manages access to at least one of a plurality of content;
  receiving an input selecting a first content of the plurality of content;
  permitting access to the first content using the digital rights management platform stored on the at least one portable device; and
  transmitting the first content from the access point to the at least one portable device during travel to a destination location.

18. The method of claim 17, wherein the access point comprises at least one of a router, a switch, a wireless access point, a fixed access point, and an intermediate access point.

19. The method of claim 17, wherein the digital rights management platform is transmitted from the access point to the at least one portable device so that the digital rights management platform is stored on the at least one portable device.

20. The method of claim 17, further comprising receiving payment information after transmitting the first content to the at least one portable device.

21. The method of claim 17, further comprising enabling the first content to be consumed after the vehicle has arrived at the destination location.

22. A system comprising:
  one or more processors;
  a computer readable medium operably coupled to the one or more processors; and
  a plurality of instructions stored on the computer readable medium and executable by the one or more processors, the plurality of instructions comprising:
    instructions that cause the one or more processors to send a communication signal from an access point located within a vehicle to at least one portable device located within the vehicle;
    instructions that cause the one or more processors to transmit a digital rights management platform to the at least one portable device so that the digital rights management platform is stored on the at least one portable device;
    instructions that cause the one or more processors to receive an input selecting a first content of the plurality of content;
    instructions that cause the one or more processors to permit access to the first content using the digital rights management platform stored on the at least one portable device; and
    instructions that cause the one or more processors to transmit the first content from the access point to the at least one portable device during travel to a destination location.

23. The system of claim 22, wherein the digital rights management platform is transmitted from the access point to the at least one portable device so that the digital rights management platform is stored on the at least one portable device.

24. The system of claim 22, wherein the plurality of instructions further comprises instructions that cause the one or more processors to receive payment information after the first content is transmitted to the at least one portable device.

25. The system of claim 22, wherein the plurality of instructions further comprises instructions that cause the one or more processors to enable the first content to be consumed after the vehicle has arrived at the destination location.

* * * * *